US011320973B1

(12) United States Patent
Ryu

(10) Patent No.: US 11,320,973 B1
(45) Date of Patent: May 3, 2022

(54) METHOD OF PROVIDING USER INTERFACE FOR SOCIAL NETWORKING

(71) Applicant: OXOpolitics Inc., Seoul (KR)

(72) Inventor: Hohyon Ryu, San Mateo, CA (US)

(73) Assignee: OXOpolitics Inc., Seoul (KR)

( * ) Notice: Subject to any disclaimer, the term of this patent is extended or adjusted under 35 U.S.C. 154(b) by 0 days.

(21) Appl. No.: 17/085,134

(22) Filed: Oct. 30, 2020

(51) Int. Cl.
  *G06F 3/048* (2013.01)
  *G06F 3/04842* (2022.01)
  *G06Q 50/00* (2012.01)

(52) U.S. Cl.
  CPC ......... *G06F 3/04842* (2013.01); *G06Q 50/01* (2013.01)

(58) Field of Classification Search
  None
  See application file for complete search history.

(56) References Cited

U.S. PATENT DOCUMENTS

| 2010/0010958 | A1  | 1/2010  | Perrow et al. |            |
|--------------|-----|---------|---------------|------------|
| 2011/0004831 | A1* | 1/2011  | Steinberg     | G06F 3/04842 |
|              |     |         |               | 715/753    |
| 2011/0283205 | A1* | 11/2011 | Nie           | G06F 16/9535 |
|              |     |         |               | 715/763    |
| 2013/0018896 | A1* | 1/2013  | Fleischman    | G06F 16/40 |
|              |     |         |               | 707/748    |
| 2013/0304822 | A1* | 11/2013 | Tetreault     | H04N 21/2187 |
|              |     |         |               | 709/204    |
| 2014/0258191 | A1* | 9/2014  | Gubin         | G06Q 50/01 |
|              |     |         |               | 706/12     |
| 2015/0006253 | A1  | 1/2015  | Fedosseev     |            |
| 2019/0104188 | A1* | 4/2019  | Oldham        | H04L 67/22 |

FOREIGN PATENT DOCUMENTS

| HR | 1020140072629 A | 6/2014  |
| KR | 101088710 B1    | 12/2011 |
| KR | 101562729 B1    | 10/2015 |
| KR | 1020160051724 A | 5/2016  |
| KR | 101722746 B1    | 4/2017  |
| KR | 1020200023716 A | 3/2020  |

OTHER PUBLICATIONS

Korea Patent Office, Office Action, dated Aug. 30, 2021.

* cited by examiner

*Primary Examiner* — William C Trapanese
(74) *Attorney, Agent, or Firm* — Umberg Zipser LLP; Ryan Dean

(57) ABSTRACT

An exemplary embodiment of the present disclosure discloses a non-transitory computer readable medium storing a computer program, in which the computer program provides a user interface for social networking when executed by one or more processors, the user interface including: a first area, displaying a plurality of entities corresponding to a plurality of classes preset according to characteristics of users; and a second area, displaying a first subset of contents to a first user as a default view, wherein the first subset of contents are selected based at least in part on at least one first class associated with a first user among the plurality of classes, and enabling to display a second subset of contents based at least in part on a change input, in response to the change input by the first user.

14 Claims, 10 Drawing Sheets us 11,320,973 b1

METHOD OF PROVIDING USER INTERFACE FOR SOCIAL NETWORKING

TECHNICAL FIELD

The present disclosure relates to a method of providing a user interface for social networking, and particularly, to a method of providing a user interface which displays contents in a social network service.

BACKGROUND ART

Due to the recent development of communication technology, various community means, such as a Social Network Service (SNS) enabling online communication by using smart devices including smart phones, computers, and the like, are being activated.

The SNS functions as a community means. Accordingly, the success of the SNS is highly dependent on the strength of communication within the SNS. The strength of communication in the SNS may be based on the number of users of a corresponding service, user participation degrees in the service, and the like. Accordingly, many SNSs design services to facilitate users' participation in the services. A user interface of software is a tool for enabling a user to interact with the corresponding software. The user interface of software or Software-as-a-Service (SaaS) constituting the SNS may greatly influence the intensity of user participation in the service. Accordingly, there is a demand for developing a user interface that may facilitate the participation of users in the SNS.

PRIOR ART LITERATURE

[Patent Document] Korean Patent No. 10-1562729

SUMMARY OF THE INVENTION

The present disclosure is conceived in response to the background art, and has been made in an effort to provide a method of providing a user interface for social networking.

The technical objects of the present disclosure are not limited to the foregoing technical objects, and other non-mentioned technical objects will be clearly understood by those skilled in the art from the description below.

An exemplary embodiment of the present disclosure for solving the problem discloses a non-transitory computer readable medium storing a computer program. The computer program provides a user interface for social networking when executed by one or more processors, and the user interface includes: a first area, displaying a plurality of entities corresponding to a plurality of classes preset according to characteristics of users; and a second area, displaying a first subset of contents to a first user as a default view, in which the first subset of contents are selected based at least in part on at least one first class associated with a first user among the plurality of classes, and enabling to display a second subset of contents based at least in part on a change input, in response to the change input by the first user.

The user interface may further include a third area enabling the user's input for generating the contents.

The user interface may further include a fourth area being rendered in response to a selection of the first user on any one of the contents, in which the fourth area may display at least detailed information of the selected contents.

The fourth area may enable the first user to interact with the selected contents.

The first subset of the contents may be selected based at least in part on the user's interaction with the selected contents.

The first subset of the contents may display the contents to the first user, in which the contents are arranged based on at least one of similarity between the first class and the classes associated with the users who generated each of the contents, or similarity between the first class and the classes associated with the users interacting with each of the contents.

The fourth area may further display a map visually displaying relationship between the plurality of preset classes, and the map may visually highlight the classes associated with the users interacting with the selected contents.

The change input may be that at least one of the entities in the first area being selected by the user.

The second area may display the second subset of the contents in response to the change input by the first user, and the second subset of the contents are selected based at least in part on at least one class associated with the entities selected according to the change input.

The plurality of preset classes may be assigned to each of the users based at least in part on the characteristics of the users.

The characteristics of the user may include political disposition.

Another exemplary embodiment of the present disclosure for solving the problem discloses a method for displaying a user interface for social networking in a user terminal, the method including: displaying a first area displaying a plurality of entities corresponding to a plurality of classes preset according to characteristics of users; and displaying a second area displaying a first subset of contents to the first user as a default view, in which the first subset of contents are selected based at least in part on at least one first class associated with a first user among the plurality of classes, and enabling to display a second subset of contents based at least in part on a change input, in response to the change input by the first user.

Another exemplary embodiment of the present disclosure for solving the problem discloses a user terminal including: a processor; a memory; and an output unit providing a user interface; in which the user terminal includes: a first area displaying a plurality of entities corresponding to a plurality of classes preset according to characteristics of users; and a second area displaying a first subset of contents to the first user as a default view, in which the first subset of contents are selected based at least in part on at least one first class associated with a first user among the plurality of classes, and enabling to display a second subset of contents based at least in part on a change input, in response to the change input by the first user.

Yet another exemplary embodiment of the present disclosure for solving the problem discloses a server including: a processor; a network unit; and a memory, in which the processor is configured to determine whether to transmit a user interface to a user terminal through the network unit, and the user interface includes: a first area displaying a plurality of entities corresponding to a plurality of classes preset according to characteristics of users; and a second area displaying a first subset of contents to the first user as a default view, in which the first subset of contents are selected based at least in part on at least one first class associated with a first user among the plurality of classes, and enabling to display a second subset of contents based at least in part on a change input, in response to the change input by the first user.

According to the exemplary embodiments of the present disclosure, it is possible to provide the user interface, which is capable of activating social network service.

The effects of the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like numerals are generally provided as a reference of such constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

DETAILED DESCRIPTION

Figure 1:
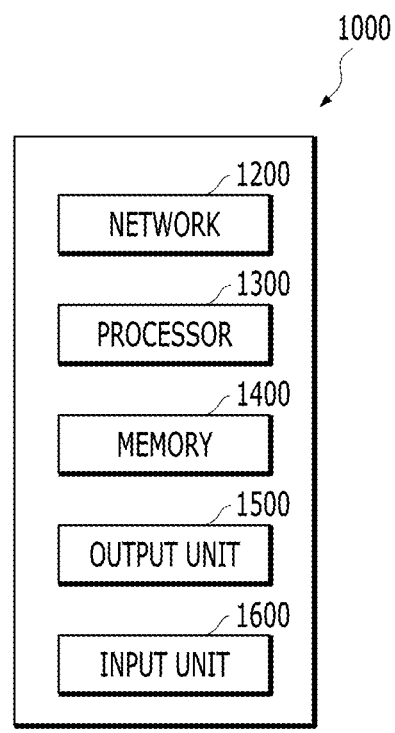
FIG. 1 is a block diagram illustrating a computing device providing a user interface for social networking according to several exemplary embodiments of the present disclosure.

Various exemplary embodiments are described with reference to the drawings. In the present specification, various descriptions are presented for understanding the present disclosure. However, it is obvious that the exemplary embodiments may be carried out without a particular description.

Terms, "component", "module", "system", and the like used in the present specification indicate a computer-related entity, hardware, firmware, software, a combination of software and hardware, or execution of software. For example, a component may be a processor, a procedure executed in a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Furthermore, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Furthermore, a term "and/or" used in the present specification shall be understood to refer to and include all of the possible combinations of one or more items among the listed relevant items.

A term "include" and/or "including" shall be understood to mean that a corresponding characteristic and/or a constituent element exists. Furthermore, a term "include" and/or "including" means that a corresponding characteristic and/or a constituent element exists, but it shall be understood that the existence or an addition of one or more other characteristics, constituent elements, and/or a group thereof is not excluded. Furthermore, unless otherwise specified or when it is unclear that a single form is indicated in context, the singular shall be construed to generally mean "one or more" in the present specification and the claims.

"Equal to or more" and/or "less than" may be interpreted as "larger than" and/or "equal to or less than", and vice versa.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify the interchangeability of hardware and software, the various illustrative components, blocks, configurations, means, logic, modules, circuits, and operations have been generally described above in the functional aspects thereof. Depending on a specific application or design restraints given to the general system, it decides whether the functionality is implemented as hardware or software. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art can utilize or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

FIG. 1 is a block diagram illustrating a computing device providing a user interface for social networking according to an exemplary embodiment of the present disclosure.

A computing device 1000 providing a user interface for social networking according to the exemplary embodiment of the present disclosure may include a network unit 1200, a processor 1300, a memory 1400, an output unit 1500, and an input unit 1600.

The computing device 1000 according to several exemplary embodiments of the present disclosure may include a Personal Computer (PC), a notebook computer, a mobile terminal, a smart phone, a tablet PC, and the like, and may include all kinds of terminals which are capable of accessing a wired/wireless network.

The network unit 1200 may transceive data for providing the user interface for social networking according to the exemplary embodiment of the present disclosure and the like with other computing devices, servers, and the like.

The network unit 1200 according to the exemplary embodiment of the present disclosure may operate based on a predetermined type of currently used and implemented wired/wireless communication technology, such as near field (short range) communication technology, telecommunication technology, wired communication technology, and wireless communication technology.

The processor 1300 according to the exemplary embodiment of the present disclosure may consist of one or more cores, and may include a processor, such as a Central Processing Unit (CPU), a General Purpose Graphics Processing Unit (GPGPU), and a Tensor Processing Unit (TPU) of the computing device, for providing a user interface for social networking. The processor 1300 may read a computer program stored in the memory 1400 and provide the user interface for social networking according to the exemplary embodiment of the present disclosure. At least one of the CPU, the GPGPU, and the TPU of the processor 1300 may provide or generate the user interface for social networking. For example, the CPU with GPGPU may provide the user interface for social networking. Furthermore, in the exemplary embodiment of the present disclosure, it is possible to provide the user interface for social networking by using the processors of the plurality of computing devices. Furthermore, the computer program executed in the computing device according to the exemplary embodiment of the present disclosure may be a CPU, GPGPU, or TPU executable program.

The memory 1400 according to the exemplary embodiment of the present disclosure may store the predetermined form of information generated or determined by the processor 1300 and the predetermined form of information received by the network unit 1200.

According to the exemplary embodiment of the present disclosure, the memory 1400 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 1000 may also be operated in relation to web storage performing a storage function of the memory 1400 in the Internet. The description of the foregoing memory is merely illustrative, and the present disclosure is not limited thereto.

The output unit 1500 according to the exemplary embodiment of the present disclosure may display a predetermined User Interface (UI) for social networking. The output unit 1500 may display the user interface illustrated in FIGS. 2 to 9. The user interfaces which will be illustrated and described below are merely examples, and the present disclosure is not limited thereto.

The output unit 1500 according to the exemplary embodiment of the present disclosure may output the predetermined form of information generated or determined by the processor 1300 and the predetermined form of information received by the network unit 1200.

In the exemplary embodiment of the present disclosure, the output unit 1500 may include at least one of a Liquid Crystal Display (LCD), a Thin Film Transistor Liquid Crystal Display (TFT LCD), an Organic Light Emitting Diode (OLED), a flexible display, and a 3D display. Some display modules among them may be formed of a transparent or light transmissive type so that the outside may be viewed through the display modules. This may be referred to as a transparent display module, and a representative example of the transparent display module includes a Transparent OLED (TOLED).

A user input may be received through the input unit 1600 according to the exemplary embodiment of the present disclosure. The input unit 1600 according to the exemplary embodiment of the present disclosure may be provided with keys and/or buttons for receiving a user input. According to the user input through the input unit 1600, a computer program for providing the user interface for social networking according to the exemplary embodiments of the present disclosure may be executed.

The input unit 1600 according to the exemplary embodiments of the present disclosure may receive a signal by detecting a button manipulation or a touch input of a user or receive a voice or an operation of a user and the like through a camera or a microphone and convert the received signal, voice, or operation to an input signal. To this end, speech recognition technology or motion recognition technology may be used.

The input unit 1600 according to the exemplary embodiments of the present disclosure may also be implemented as external input equipment connected with the computing device 1000. For example, the input equipment may be at least one of a touch pad, a touch pen, a keyboard, and a mouse for receiving a user input, but this is merely an example, and the present disclosure is not limited thereto.

The input unit 1600 according to the exemplary embodiments of the present disclosure may recognize a touch input of a user. The input unit 1600 according to the exemplary embodiments of the present disclosure may have the same configuration as that of the output unit 1500. The input unit 1600 may be formed of a touch screen implemented so as to receive a selection input of a user. In the touch screen, any one of a contact type capacitance method, an infrared light sensing method, a Surface Ultrasonic Wave (SAW) method, a piezoelectric method, and a resistive film method may be used. The detailed description for the foregoing touch screen is merely illustrative according to the exemplary embodiments of the present disclosure, and various touch screen panels may be applied to the computing device 1000. The input unit 1600 formed of a touch screen may include a touch sensor. The touch sensor may be configured to convert a change in pressure applied to a specific region of the input unit 1600 or electrostatic capacity generated in a specific region of the input unit 1600 into an electric input signal. The touch sensor may be configured so as to detect pressure of a touch, as well as a location and an area of a touch. When a touch input is made to the touch sensor, a signal(s) corresponding to the touch input is transmitted to a touch controller. The touch controller processes the signal(s) and then transmits data corresponding to the signal(s) to the processor 1300. Accordingly, the processor 1300 may recognize a touched area of the input unit 1600 and the like.

In the exemplary embodiment of the present disclosure, the server may also include other configurations for performing a server environment. The server may include all of the predetermined types of devices. The server is a digital device, which could also include a processor similar to those of a laptop computer, a notebook computer, a desk top computer, a web pad, a mobile phone, and has computing capability with a memory.

The server (not illustrated) which performs an operation for providing the user interface for social networking according to the exemplary embodiment of the present disclosure to the user terminal may include a network unit, a processor, and a memory.

The server may generate the user interface according to the exemplary embodiments of the present disclosure. The server may be a computing system which provides a client (for example, a user terminal) with information through a network. The server may transmit the generated user interface to the user terminal. In this case, the user terminal may be a predetermined form of computing device 100 which is capable of accessing the server. The processor of the server may transmit the user interface to the user terminal through the network unit. The server according to the exemplary embodiments of the present disclosure may be, for example, a cloud server. The server may be a web server processing the service. The kind of foregoing server is merely an example, and the present disclosure is not limited thereto.

Each of the network unit, the processor, and the memory included in the server according to the exemplary embodiments of the present disclosure may perform the same roles as those of the network unit 1200, the processor 1300, and the memory 1400 included in the computing device 1000 or be identically configured to the network unit 1200, the processor 1300, and the memory 1400 included in the computing device 1000.

An area in the exemplary embodiments of the present disclosure may mean a layer, which is displayed in the user interface and is used to overlap and display a plurality of images. Two or more overlapped areas may also be displayed. In the case where two or more overlapped areas are displayed, one area may be hidden by another area and not be viewed. Otherwise, in the case where two or more overlapped areas are displayed and an upper area is partially semi-transparently displayed, at least a part of a lower area may be viewed. Two or more areas may have the same size. Furthermore, two or more areas may also have the different sizes. Otherwise, the plurality of areas may be non-overlapping spaces on a screen. One area may also include only one area, or may also include a plurality of sub areas. One area may include one or more display objects.

In the exemplary embodiments of the present disclosure, the object may be a set of a picture, a symbol, or a character corresponding to each of a program, a command, and data. According to the exemplary embodiments of the present disclosure, the object may be used for receiving a user selection input. For example, when a user input for an object is received, the processor 1300 may execute a command or data stored in response to the corresponding object and display the command or the data in the user interface. In the exemplary embodiments of the present disclosure, the object and the display object may be interpreted as the same meaning.

In the exemplary embodiments of the present disclosure, "display" may be an operation for displaying data to the user through the output unit 1500. "Display" and "display" may be interchangeably used.

Hereinafter, the method of providing the user interface for social networking according to the exemplary embodiments of the present disclosure will be described.

Figure 2:
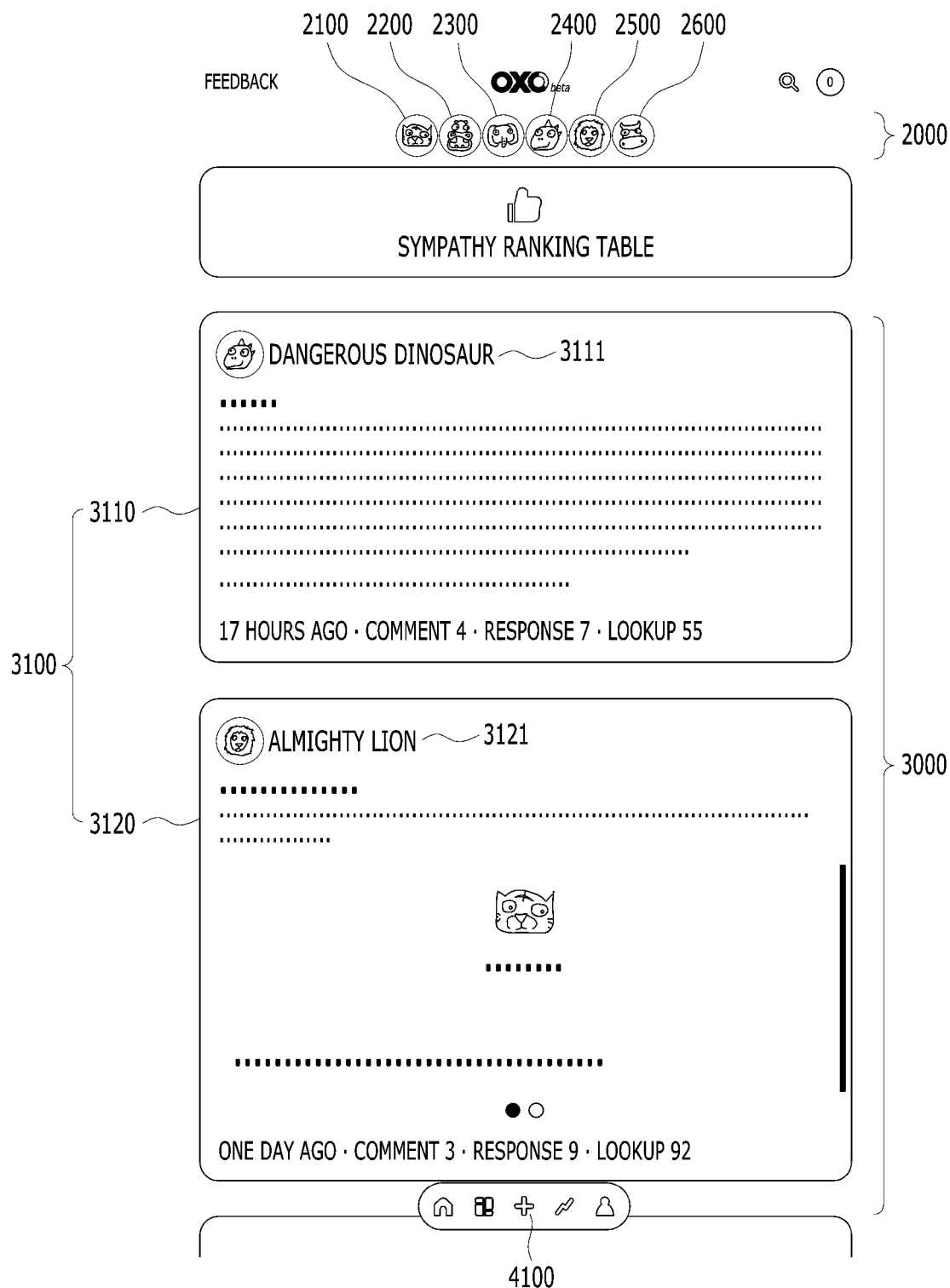
FIG. 2 is a diagram illustrating an example of a first area and a second area of the user interface for social networking according to several exemplary embodiments of the present disclosure.

FIG. 2 is a diagram illustrating an example of a first area and a second area of the user interface for social networking according to several exemplary embodiments of the present disclosure.

Referring to FIG. 2, the user interface may include a first area 2000 displaying a plurality of entities 2100 to 2600, and a second area 3000 displaying a first subset 3100 of the contents. The processor 1300 may display the first area 2000 displaying the plurality of entities 2100 to 2600 and the second area 3000 displaying the first subset 3100 of the contents. Furthermore, the processor may receive one or more contents to be displayed in the second area 3000 through the network unit 1200. However, the foregoing constituent elements are not essential to implement the user interface, so that the user interface may include fewer or more constituent elements than the constituent elements listed above.

The first area 2000 may include the plurality of entities 2100 to 2600, and may allow a change input of a user.

The entities 2100 to 2600 may correspond to a plurality of predetermined classes. For example, in political social network services, the plurality of different classes may exist according to criteria such as the tendency of the progressive-conservative degree. The plurality of classes may be matched to a predetermined color, a symbol, a sign, an icon, a character, and the like for user convenience. For example, the plurality of classes may be matched to arbitrarily designated animal icons, respectively. For example, the "tiger" entity may correspond to the most progressive class and the "lion" entity may correspond to the most conservative class. The matching relationship between the entity and the icon may be displayed to the user according to the predetermined relationship or may be reconfigured according to a selection of the user. However, the present disclosure is not limited thereto. For example, one entity may many-to-one correspond to the plurality of classes.

In the drawing, the example, in which the entities expressed with the total of 5 icons including "tiger", "hippo", "elephant", "dinosaur", and "lion" are displayed in the first area 2000, is illustrated. However, the present disclosure is not limited thereto, and the entity may be variously expressed with a predetermined number and form.

In the meantime, at least one entity may be selected according to a change input of the user. For example, when the user clicks the entity 2200 of "hippo", the entity 2200 of "hippo" may be selected. However, the present disclosure is not limited thereto, and the plurality of entities may be selected at the same time.

In the meantime, the change input of the user may include a double-click, hovering, a touch, and the like, in addition to the click, and the method of selecting the object by the user is the publicly known technology well-known in the art, so that a detailed description thereof will be omitted.

When a predetermined entity is selected by the change input of the user, a second subset 3200 of the content, which is based at least in part on a class corresponding to the selected entity 2200, may be displayed in the second area 3000. For example, when the user clicks the entity 2200 of "hippo", contents 3210 and 3220 generated by the user associated with the class corresponding to the entity of "hippo" may be displayed. That is, the user may collect and view the contents related to the class of interest by selecting the predetermined entity. This will be described in more detail with reference to FIG. 3.

In another exemplary embodiment, the predetermined entity may be selected under the condition of the occurrence of a predetermined event, not the change input of the user. For example, the predetermined event may occur under an achievement condition in which the user performs a specific operation in the corresponding social network service. For example, when the user interacts with the content related to a specific entity by the predetermined number of times or more, the corresponding specific entity may be considered as the selected entity 2200. The interaction may include viewing a content, feedback on content, writing a comment, responding to a survey, and the like, but is not limited thereto.

In the meantime, the plurality of predetermined classes, which correspond to the entities, respectively, may be allocated to the users based at least in part on the characteristics of the users, respectively. Accordingly, each entity may at least partially represent the characteristic of the user, and each entity is graphically expressed to facilitate an interest of the user. The entity, the plurality of predetermined classes, and the method of allocating the class to each user will be described below with reference to FIGS. 7 and 8 in more detail.

The second area 3000 may display the different subsets 3100 and 3200 of the content, and the subsets 3100 and 3200 of the content may include one or more selected contents 3110, 3120, 3210, and 3220.

Each of the contents 3110, 3120, 3210, and 3220 may include information about the class associated with the user who writes the content, and entities 3111, 3121, 3211, and 3221 corresponding to the corresponding classes may be displayed together with the contents. For example, the content written by the user associated with the entity of "dinosaur" may display the icon 3111 of "dinosaur" together with the content 3110.

As described above, the class associated with the user who generates the content is displayed together with the corresponding content, so that the user may understand the contents in a more-three-dimensional manner based on the perception of the author's disposition.

In the meantime, each of the contents 3110, 3120, 3210, and 3220 may display at least a part of the contents. For example, only the constant amount of contents may be displayed from an upper end of the content. Otherwise, in the case where an image and the like are included in the contents, the image may be displayed, the core contents of the content may be displayed, or the entire contents of the content may be displayed. However, the present disclosure is not limited thereto.

In the meantime, each of the contents 3110, 3120, 3210, and 3220 may be displayed in a block form that is combined up, down, left, and right, or may be displayed in a list form. However, the present disclosure is not limited thereto, only one content may be displayed at a time, and the contents may be displayed in the form of flipping the content through a control (not illustrated), such as a direction key. In the drawing, the case where the user views one or more contents displayed in the list form by scrolling is illustrated as an example. However, the present disclosure is not limited thereto, the method of displaying one or more contents by configuring the one or more contents in various layouts is the publicly known technology well known in the art, so that a detailed description thereof will be omitted.

The second area 3000 may display the first subset 3100 of the content selected based at least in part on the class (hereinafter, referred to as "the first class") associated with the user (hereinafter, referred to as "the first user") using the social networking service according to the several exemplary embodiments of the present disclosure through a user terminal as a default view. For example, the user interface according to the exemplary embodiment of the present disclosure provided to the user terminal of the first user may select the contents generated by the users associated with the class adjacent to the first class and configure the first subset 3100 of the content.

In the drawing, an example of the first subset 3100 of the content to be displayed to the first user associated with the entity of "dinosaur" is illustrated. That is, in the user terminal of the first user associated with the entity of "dinosaur", the content 3110 generated by the users associated with the entity of "dinosaur" or the contents 3120 generated by the users associated with another entity (for example, the entity of "lion") adjacent to the entity of "dinosaur" may configure the first subset 3100 of the content and be displayed as a default view. However, the present disclosure is not limited thereto.

As described above, by preferentially displaying the contents of the user having the same tendency as that of the user, it is possible to inspire the user's interest in social network services and induce active sharing of opinions.

Otherwise, the user associated with the class adjacent to the first class may select the interacting contents and configure the first subset of the content. That is, in the user terminal of the first user associated with the entity of "dinosaur", the content in which the users associated with the entity of "dinosaur" expressed the approval, or the content in which the users associated with another entity (for example, the entity of "lion") adjacent to the entity of "dinosaur" expressed the approval may configure the first subset 3100 of the content and be displayed as a default view. However, the present disclosure is not limited thereto.

Through this, the content is generated after the class that does not match the user's characteristic is intentionally assigned, so that it is possible to prevent illegal use such as preferentially displaying the content of different inclination on the terminal of another user and the conflict encouragement due to the illegal use.

Otherwise, the first subset 3100 of the content may be configured with the content selected by combining the two references. However, the present disclosure is not limited thereto, and the content for configuring the first subset 3100 of the content may be selected by three or more references including the two references.

In the meantime, in the first subset 3100 of the content, the one or more included contents 3110 and 3120 may be aligned according to a ranking and displayed. For example, as the degree of meeting the above-described, but not limited to, conditions are higher, the content having the higher priority may be displayed. For example, as the proximity between the class associated with the user generating the content and the first class is greater, the corresponding content may be disposed at the upper end even in the first subset 3100 of the content and displayed to the first user.

However, the present disclosure is not limited thereto, and the contents may be displayed by being aligned according to various criteria, such as generation time and the amount of interaction.

Figure 3:
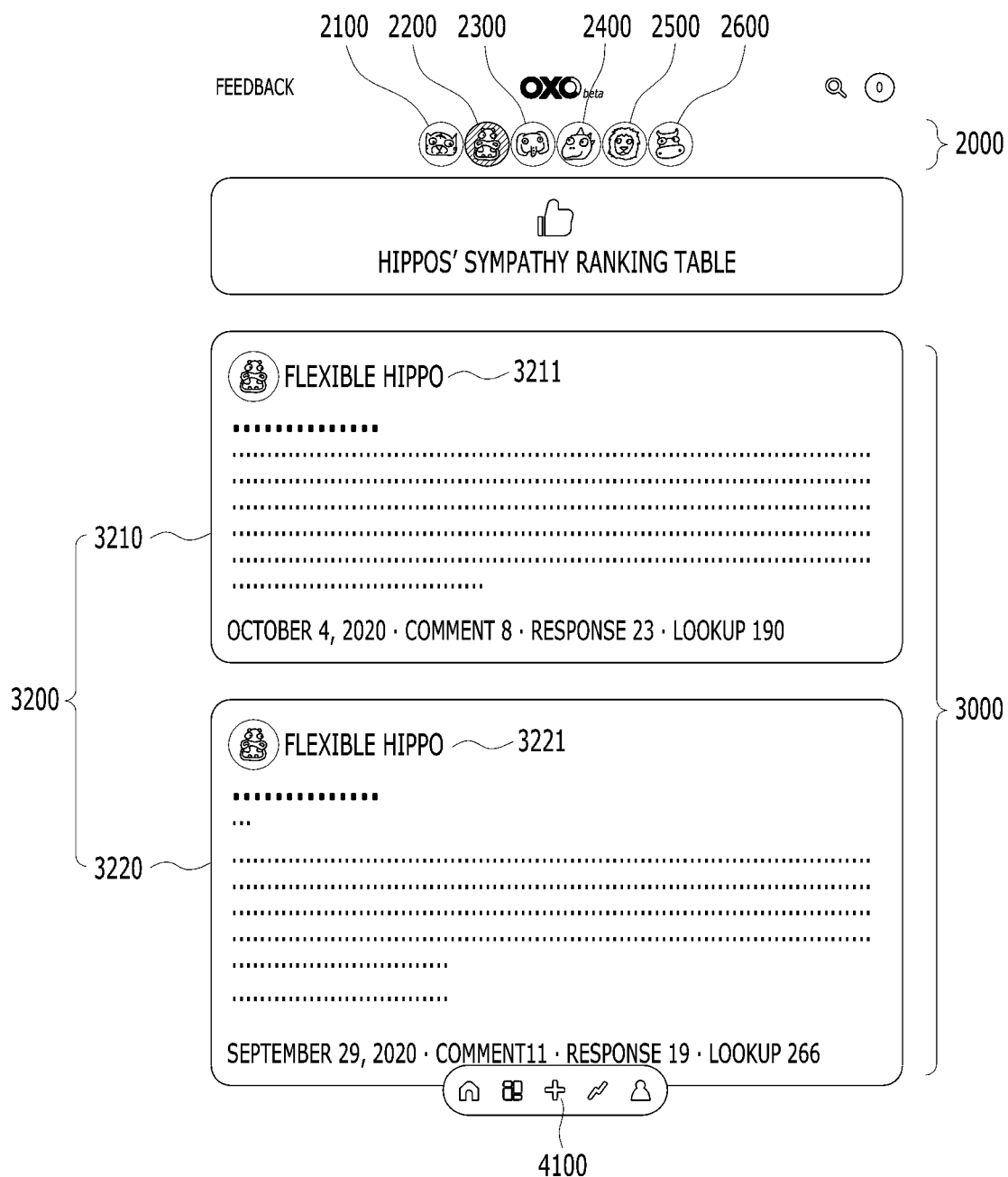
FIG. 3 is a diagram illustrating an example of the second area to be displayable in response to a change input of a user according to several exemplary embodiments of the present disclosure.

FIG. 3 is a diagram illustrating an example of the second area to be displayed in response to a change input of a user according to several exemplary embodiments of the present disclosure.

Referring to FIG. 3, the user interface may include the first area 2000 which displays the plurality of entities 2100 to 2600 including the predetermined entity 2200 selected by the change input of the user, and the second area 3000, which displays the second subset 3200 of the content. The processor 1300 may display the first area 2000 which displays the plurality of entities 2100 to 2600 including the predetermined entity 2200 selected by the change input, and the second area 3000, which displays the second subset 3200 of the content. Furthermore, the processor may receive one or more contents to be displayed in the second area 3000 through the network unit 1200. However, the foregoing constituent elements are not essential to implement the user interface, so that the user interface may include fewer or more constituent elements than the constituent elements listed above.

The second subset 3200 of the content may be configured with the content selected based at least in part on the class corresponding to the predetermined entity 2200 selected according to the change input of the user. For example, when the user selects the entity 2200 of "hippo", the second subset 3200 of the content may be configured only with the contents 3210 and 3220 generated by the users associated with the class corresponding to the entity of "hippo" and displayed to the user. That is, the user may collect and view the contents related to the class of interest by selecting the predetermined entity. However, the present disclosure is not limited thereto.

In the meantime, when the user selects the predetermined content among the contents 3110, 3120, 3210, 3220 displayed in the second area 3000, a fourth area 5000 may be rendered. The fourth area 5000 will be described below with reference to FIGS. 5 and 6 in more detail.

In the meantime, the user interface for social networking according to the exemplary embodiment of the present disclosure may include a third area 4000 allowing a user input for generating a content, or may include an object 4100 selectable by the user for rendering the third area 4000. The third area 4000 will be described below with reference to FIG. 4 in more detail.

Figure 4:
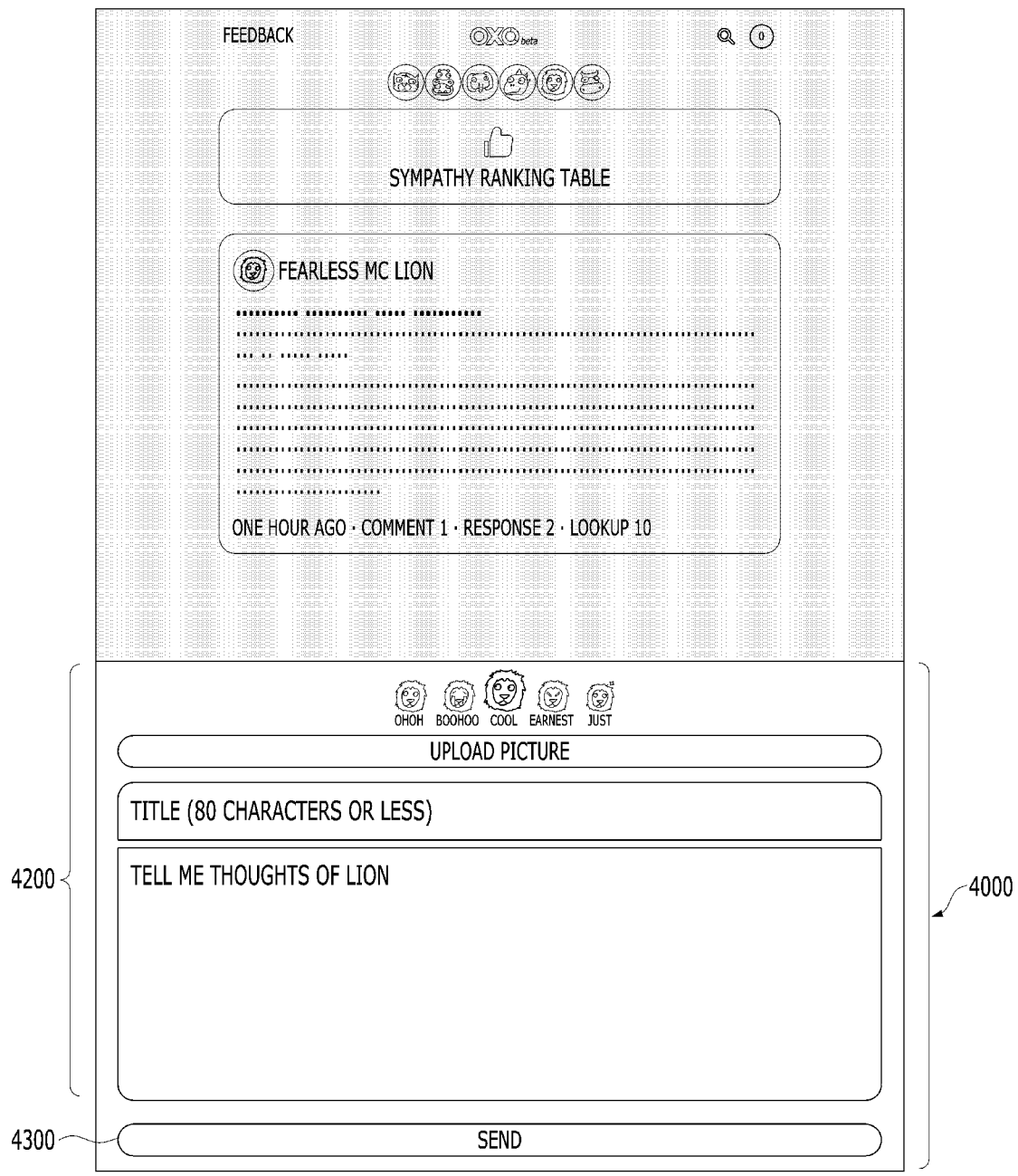
FIG. 4 is a diagram illustrating an example of a third area of the user interface for social networking according to several exemplary embodiments of the present disclosure.

FIG. 4 is a diagram illustrating an example of the third area of the user interface for social networking according to several exemplary embodiments of the present disclosure.

Referring to FIG. 4, the third area 4000 of the user interface may include an area 4200 for inputting a content, and an object area 4300 for inputting a request for generating a content. The processor 1300 may display the third area 4000 including the area 4200 for inputting the content and the object area 4300 for inputting the request for generating the content. However, the foregoing constituent elements are not essential to implement the user interface, so that the user interface may include fewer or more constituent elements than the constituent elements listed above.

In the drawing, an example in which the third area 4000 is rendered at the lower end of the screen and other areas are shaded according to the selection of the object 4100 floated at the lower end of the display screen is illustrated, but the present disclosure is not limited thereto. For example, the third area 4000 is not rendered according to the selection of the object 4100, and the third area 4000 may be maintained at a predetermined location of the display screen, such as the lower end of the second area 3000, in a visible form. Otherwise, the object 4100 may be located at the upper end or the lateral end of the screen.

In the meantime, the content input area 4200 may be configured of a title input area, a contents input area, a file (image, video, link, and the like) attachment area, and an icon selection area. For example, the icon selection area may display one or more icons selectable by the user generating the content in order to graphically express the contents of the content. When the user generates the content including an opinion against a specific topic, the user may select an icon expressing the emotion of anger and add the selected icon to the content. However, the present disclosure is not limited thereto.

The method of generating the content in the social network service is the publicly known technology well known in the art, so that a detailed description thereof will be omitted.

Figure 5:
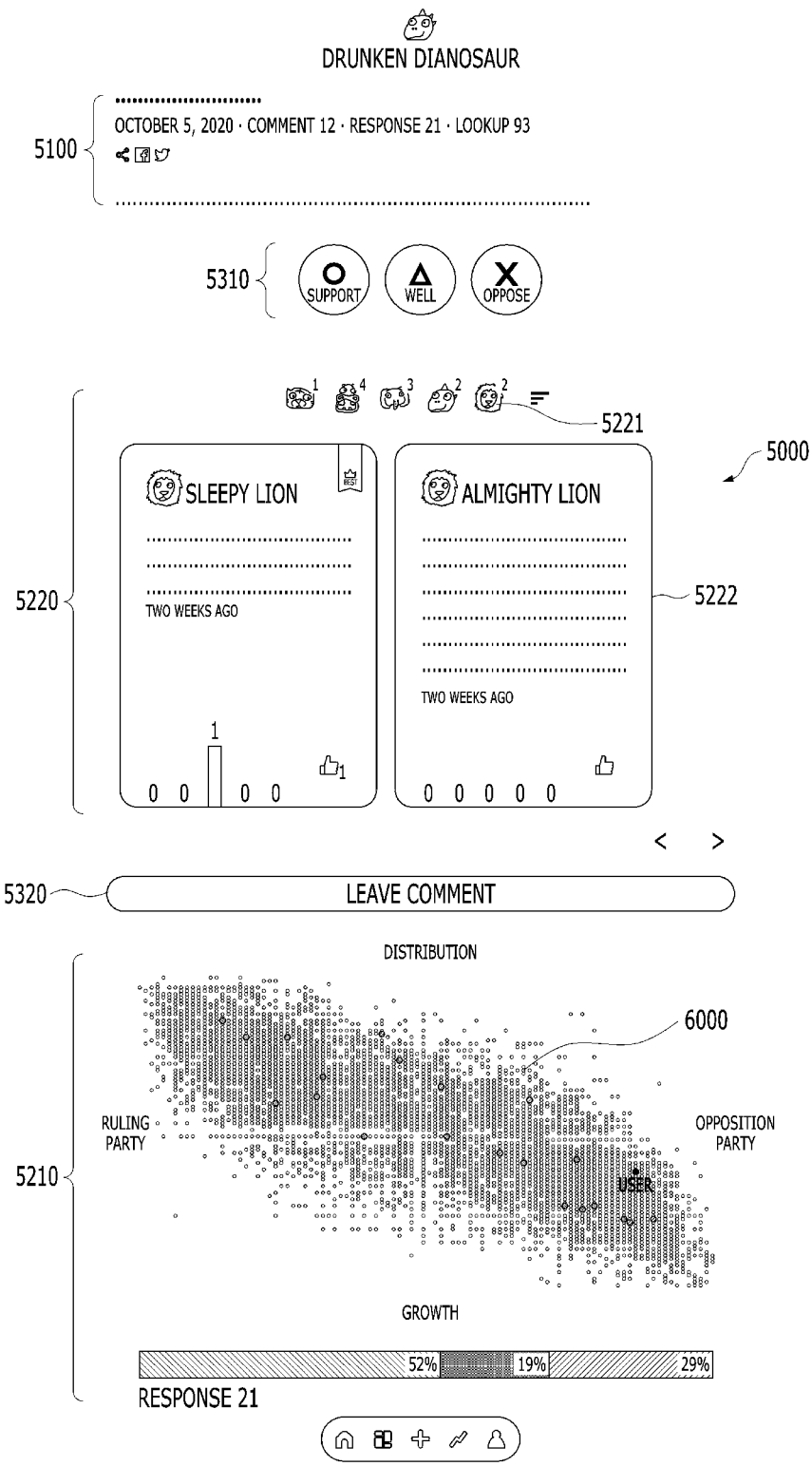
FIG. 5 is a diagram illustrating an example of a fourth area of the user interface for social networking according to several exemplary embodiments of the present disclosure.

FIG. 5 is a diagram illustrating an example of the fourth area of the user interface for social networking according to several exemplary embodiments of the present disclosure.

Referring to FIG. 5, the fourth area 5000 may include an area 5100 for displaying detailed information of the selected content, areas 5310 and 5320 allowing the interaction for the selected content, and areas 5210 and 5220 for displaying the interaction for the selected contents, and at least a part of the interaction for the selected content may be displayed in the form of a map 6000 (5210). The processor 1300 may display the fourth area 5000 including the area 5100 for displaying detailed information of the content selected through the input unit 1600, the areas 5310 and 5320 allowing the interaction for the selected content, and the areas 5210 and 5220 for displaying the interaction for the selected contents. However, the foregoing constituent elements are not essential to implement the user interface, so that the user interface may include fewer or more constituent elements than the constituent elements listed above.

The content may be selected by a click, a double-click, hovering, a touch, and the like of the first user for the predetermined content to be displayed in the second area 3000, and the method of selecting the object is the publicly known technology well known in the art, so that the detailed description thereof will be omitted.

The fourth area 5000 may be rendered according to the selection of the first user for the predetermined content. For example, the fourth area 5000 may be rendered in the form of a pop-up window having a smaller size than that of the display screen, and in this case, the first area 2000 and the second area 3000 may be partially displayed around the pop-up window. Otherwise, the fourth area 5000 may be formed in the size corresponding to a size of the display screen. However, the present disclosure is not limited thereto.

In the meantime, the fourth area 5000 may include a back button or a close button (not illustrated), and in the case where an input of the user for the corresponding button is received, the fourth area 5000 may be removed from the display screen. However, the present disclosure is not limited thereto, and for example, when the fourth area 5000 is rendered in the form of a pop-up window having a smaller size than that of the display screen, the fourth area 5000 may be removed from the display screen by selecting an area around the fourth area 5000.

In the meantime, the fourth area 5000 may display the entire contents of the selected content, and may include areas 5310 and 5320 allowing the users to interact with the corresponding contents. For example, the fourth area 5000 may include the simple interactive area 5310 in which the users may simply express the approval and the opposition against the corresponding content by selecting an "approval" object, an "opposition" object, and the like. In the meantime, the fourth area 5000 may include the detailed interactive area 5320 in which the user expresses the opinion of the user for the corresponding contents in the form of a comment. However, the present disclosure is not limited thereto, and for example, each comment 5222 may additionally include an area allowing the users to interact with the comments.

In the meantime, the fourth area 5000 may display the interactions of the users for the selected contents (5210 and 5220). For example, the detailed interactive display area 5220 may classify comments 5222 written by the users for the selected content according to the entity 5221 and display the comments (5220). For example, the detailed interactive display area 5220 may display the comments 5222 written by the users associated with the same entity 5221 as that of the first user as a default view, and display the comments written by the users associated with the different entity according to the selection of the first user.

As described above, by preferentially displaying the comments of the users having the same tendency as that of the user, it is possible to facilitate the user's interest in the social network service and encourage active opinion sharing.

Otherwise, it is possible to display all of the comments regardless of the entity, or display the comments with a lot of user interaction as the default view. However, the present disclosure is not limited thereto, and may be implemented with various modifications.

In the meantime, the simple interactive display area 5210 may display a result in which the pros and cons of the users for the selected content are simply expressed. Particularly, the simple interactive display area 5210 may include a map which visually displays the interacting users for the selected content. The map 6000 will be described below with reference to FIG. 6 in more detail.

Figure 6:
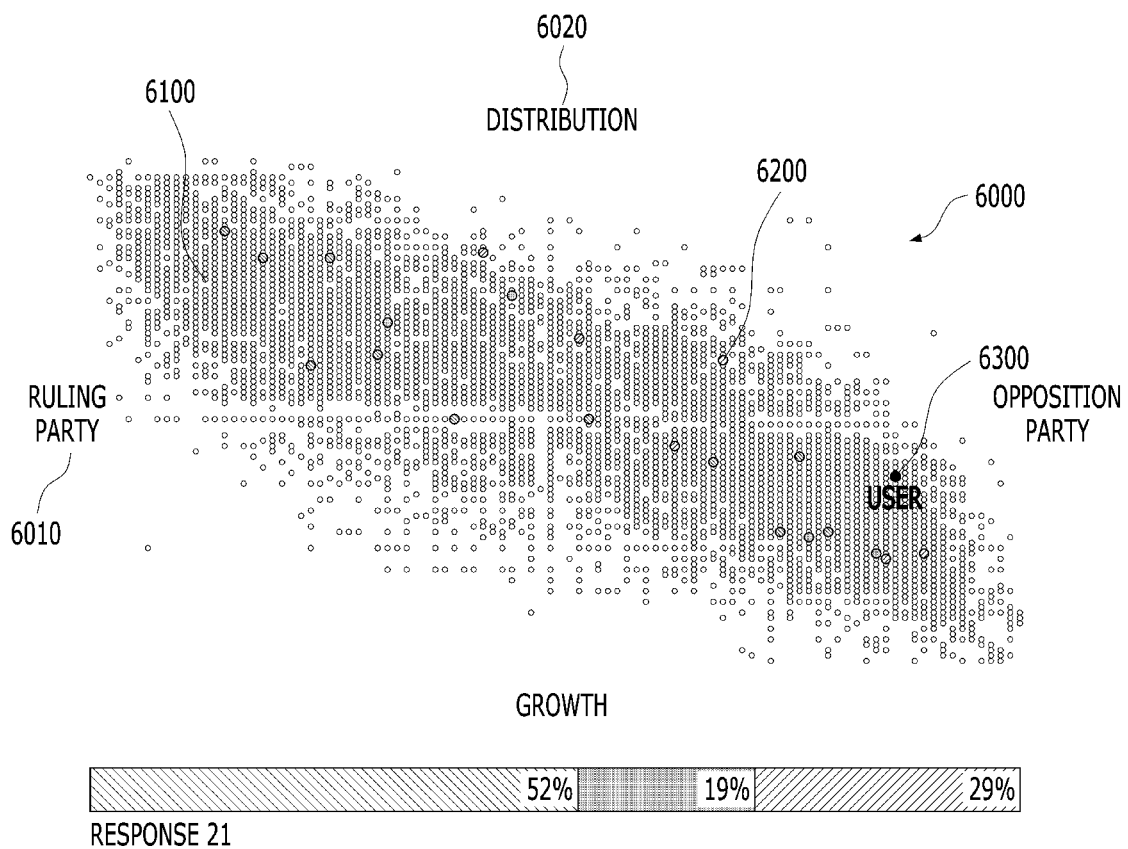
FIG. 6 is an enlarged view of a map part of FIG. 5, and is a diagram illustrating an example of a map according to several exemplary embodiments of the present disclosure.

FIG. 6 is an enlarged view of the map 6000 part of FIG. 5, and is a diagram illustrating an example of the map 6000 according to several exemplary embodiments of the present disclosure.

Referring to FIG. 6, the user interface according to the exemplary embodiment of the present disclosure may include the map 6000 which visually displays the interactive relationship between the plurality of predetermined classes, and the map 6000 may include one or more axes 6010 and 6020, a user characteristic value 6100 of the users associated with the plurality of predetermined classes, a user characteristic value 6200 of the interacting users for the selected content, and a user characteristic value 6300 of the first user. The processor 1300 may display the map 6000 which includes the one or more axes 6010 and 6020, the user characteristic value 6100 of the users associated with the plurality of predetermined classes, the user characteristic value 6200 of the interacting users for the selected content, and a user characteristic value 6300 of the first user, and visually displays the interactive relationship between the plurality of predetermined classes. However, the foregoing constituent elements are not essential to implement the user interface, so that the user interface may include fewer or more constituent elements than the constituent elements listed above.

The values of the one or more axes 6010 and 6020 may be related to the classification reference of the plurality of predetermined classes. For example, when the plurality of predetermined classes is related to the user's political disposition, the map may include two axes representing a distribution-growth orientation degree and a ruling party-opposition party support degree. However, the present disclosure is not limited thereto, and the map may include three or more axes or one axis, or no axis may be displayed.

The user characteristic values 6100, 6200, and 6300 may be determined according to each user characteristic. For example, when the characteristic of the user is related to the political disposition, the user characteristic value may be calculated by synthetizing the views on one or more political issues. The calculation of the user characteristic value based at least in part on the characteristic of the user and the allocation of the plurality of predetermined classes to each user based on the calculated user characteristic value will be described below with reference to FIGS. 7 and 8 in more detail.

In the meantime, each of the user characteristic values 6100, 6200, and 6300 may be expressed in the type of a point on the map. However, the present disclosure is not limited thereto.

In the meantime, the user characteristic value 6200 of the users interacting with the selected content may be displayed to be visually discriminated from the user characteristic value 6100 of the users who do not interact with the selected contents. For example, the user characteristic value 6200 of the users interacting with the selected content may be displayed on the map with a color value, but the user characteristic value 6100 of the users who do not interact with the selected contents may be displayed with an achromatic color, such as pale gray, so as not to be visually highlighted. However, the present disclosure is not limited thereto, the user characteristic value 6200 of the users interacting with the selected content may be visually highlighted by a different shape, or may be visually highlighted by not-displaying the user characteristic value 6100 of the users who do not interact with the selected contents.

In the meantime, the user characteristic value 6200 of the users interacting with the selected content may be visually divided based on the contents of the interaction. For example, the user characteristic value of the user who marked the approval for the selected content may be displayed in green, the user characteristic value of the user who marked the neutrality for the selected content may be displayed in yellow, and the user characteristic value of the user who marked the opposition for the selected content may be displayed in red. However, the present disclosure is not limited thereto.

In the meantime, the user characteristic value 6300 of the first user may be displayed to be visually discriminated from other user characteristic values 6100 and 6200. For example, the user characteristic value 6300 of the first user may be displayed with a bold point. However, the present disclosure is not limited thereto.

The user characteristic values of the users interacting with the selected contents are displayed on the map which visually displays the interactive relationship between the plurality of predetermined classes, so that it is possible to provide information on how the views on the corresponding content are changed according to the characteristics of the users in an intuitive form. Furthermore, the user characteristic value 6300 of the first user is displayed together, so that it is possible to recognize the thoughts of other users having the same tendency on the corresponding content.

That is, it is possible to recognize the views of other users having the same or different tendency from that of the first user for the selected content together, as well as the contents for the selected content, thereby understanding the contents in a more three-dimensional manner. Furthermore, it is possible to check the views of the users having different tendencies when the user desires, and it is possible to ultimately encourage the sharing of the active and various opinions without hindering participation in the social networking service.

Figure 7:
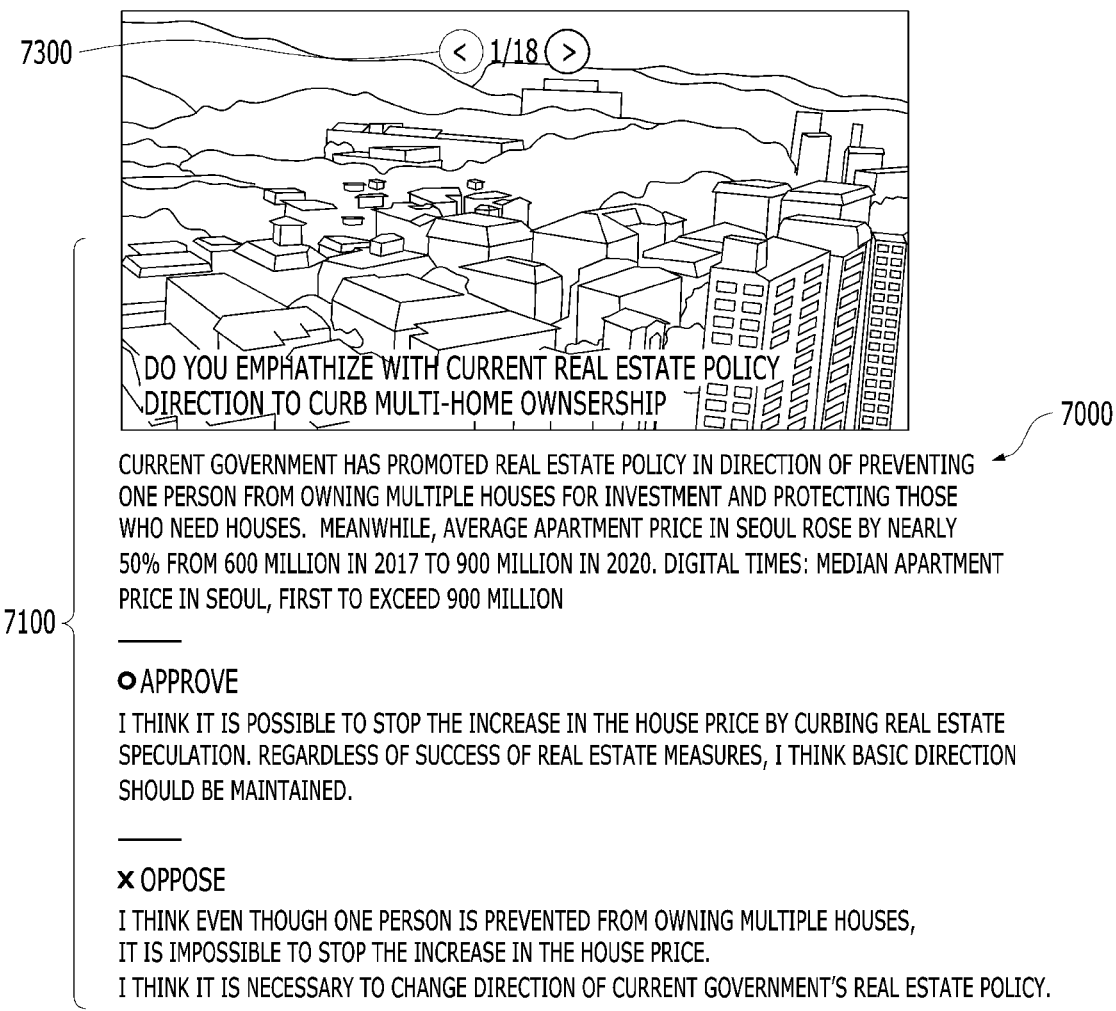
FIG. 7 is a diagram illustrating an example of a display of a survey for allocating a plurality of preset classes to a user according to several exemplary embodiments of the present disclosure.
Figure 8:
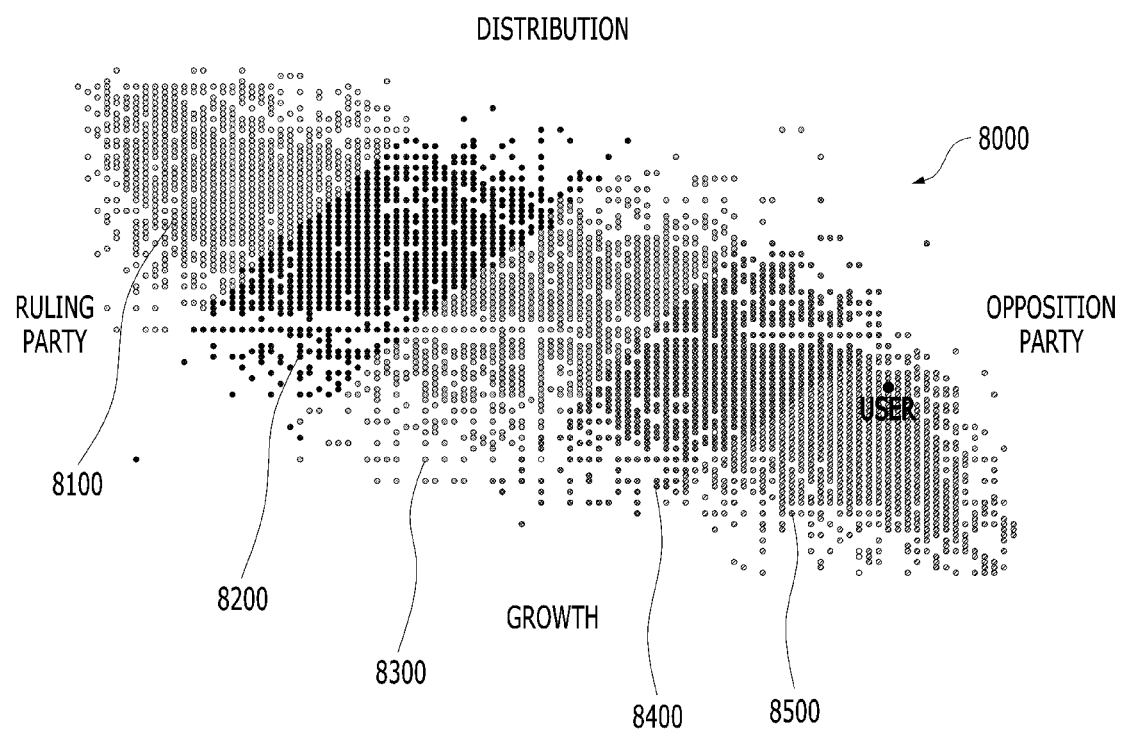
FIG. 8 is a diagram illustrating an example of a method in which users are clustered to the plurality of preset classes according to the response to the survey according to several exemplary embodiments of the present disclosure.

FIG. 7 is a diagram illustrating an example of a display of a survey for allocating a plurality of preset classes to a user according to several exemplary embodiments of the present disclosure. FIG. 8 is a diagram illustrating an example of a method in which users are clustered to the plurality of preset classes according to the response to the survey according to several exemplary embodiments of the present disclosure.

Referring to FIG. 7, the user interface may display one or more surveys for allocating the plurality of predetermined classes to the user (7000), and each survey may include an area 7100 displaying the contents of the survey, an area 7200 receiving a response of the user for the survey, and a control area 7300 controllable by the user for displaying a next survey. The processor 1300 may display the survey 7000 including the area 7100 displaying the contents of the survey, the area 7200 receiving a response of the user for the survey, and the control area 7300 controllable by the user for displaying a next survey. Furthermore, the processor 1300 may receive one or more surveys 7100 to be displayed on the output unit 1500 through the network unit 1200. However, the foregoing constituent elements are not essential to implement the user interface, so that the user interface may include more or fewer constituent elements than the constituent elements listed above.

Referring to FIG. 8, the user characteristic value may be calculated based on the response 7200 of the survey 7100 for each of the users, and the users may be clustered into the plurality of predetermined classes 8100, 8200, 8300, 8400, and 8500 based on the user characteristic values. The processor 1300 may transmit the response 7200 of the user for the survey input through the input unit 1600 to the server (not illustrated) through the network 1200 in order to analyze the response 7200 according to a clustering algorithm, which will be described below, and cluster each user to the predetermined class.

The survey 7100 may be configured with the contents which may cluster the users according to the user characteristics. For example, when the users are desired to be clustered according to the political disposition, the survey may be configured with questions by which the political dispositions of the users may be reflected to the response of the users. However, the present disclosure is not limited thereto.

In the meantime, the user may input the response to the displayed survey (7200). For example, the user may input the response to the corresponding survey by selecting an object, "support", "well", or "oppose" to each survey. However, the present disclosure is not limited thereto.

In the meantime, the survey 7100 may be configured of one or more surveys, and in this case, the user may manipulate the control area 7300, such as a left-right directional key, in order to go to a second survey after completing the response to the first survey. However, the present disclosure is not limited thereto.

In the meantime, the server (not illustrated) may include one or more publicly known clustering algorithms (for example, K-means clustering algorithm, cohesive clustering algorithm, QT cluster clustering algorithm, fuzzy C-means clustering algorithm, Shi-Malik algorithm, Meila-Shi algorithm, group average clustering algorithm, single linkage clustering algorithm, complete linkage clustering algorithm, ward algorithm, centroid clustering algorithm, and weighted group average clustering algorithm) for clustering the users based on the response of the user to one or more surveys.

The clustering algorithm divides the users into clusters or "classes", and the users of each class share the common characteristic or a core characteristic. For example, when the responses of the users include the characteristic related to the conservative political disposition, the clustering algorithm may detect the users having the conservative political disposition and allocate the detected users to the class related to the conservative political disposition.

For example, when the users are clustered according to the K-means clustering algorithm, each of the users may be expressed in the form of data having a vector form by synthesizing the responses to the survey. Furthermore, the foregoing data (that is, the user characteristic value) may form a cluster in a direction that minimizes a distribution of a distance difference with a preset number of clusters (that is, classes) (for example, form the cluster in a direction that increases similarity between the user characteristic values clustered to each class). In the exemplary embodiment of the present disclosure described with reference to FIGS. 2 to 6, the case in which the users are clustered into the classes expressed with five entities has been described as the example. However, the present disclosure is not limited thereto.

After the users are allocated to one or more classes, it is possible to provide the user interface for social networking described with reference to FIGS. 2 to 6 based on the allocated class. For example, it is possible to provide the user interface which is capable of preferentially displaying the contents of the users having the same tendency based on the allocated class, or classifying the plurality of contents for each class and displaying the plurality of contents. Furthermore, it is possible to provide a recommendation or match the users based on the allocated class. For example, it is possible to match the user to members of the National Assembly who can represent the user based on the political disposition of the user. However, the present disclosure is not limited thereto.

Figure 9:
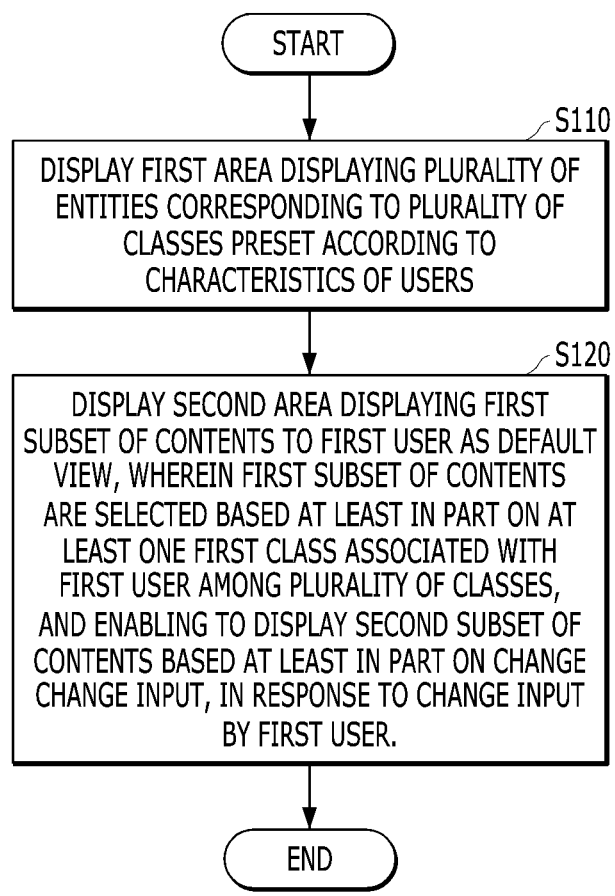
FIG. 9 is a flowchart for providing a user interface for social networking according to several exemplary embodiments of the present disclosure.

FIG. 9 is a flowchart for providing a user interface for social networking according to several exemplary embodiments of the present disclosure.

The computing device 100 may display a first area displaying a plurality of entities corresponding to a plurality of predetermined classes according to characteristics of the users. (operation S110).

The computing device 100 may display a second area which allows a first subset of a content selected based at least in part on one or more first classes associated with a first user to be displayed to the first user as a default view, and allows a second subset of the content based at least in part on a change input of the first user to be displayed in response to the change input of the first user (operation S120).

The user interface for social networking according to the exemplary embodiment of the present disclosure may be implemented by logic providing social networking.

The logic providing the social networking may also be implemented by modules, circuit, or means corresponding to the logic.

The detailed descriptions of the computing device 100 for providing the user interface for social networking according to the exemplary embodiment of the present disclosure, the first area, and the second area may be replaced with the contents described with reference to FIGS. 1 to 8, and in the method of providing the user interface for social networking based on the foregoing contents, the contents may be added, corrected, and deleted for each operation.

Figure 10:
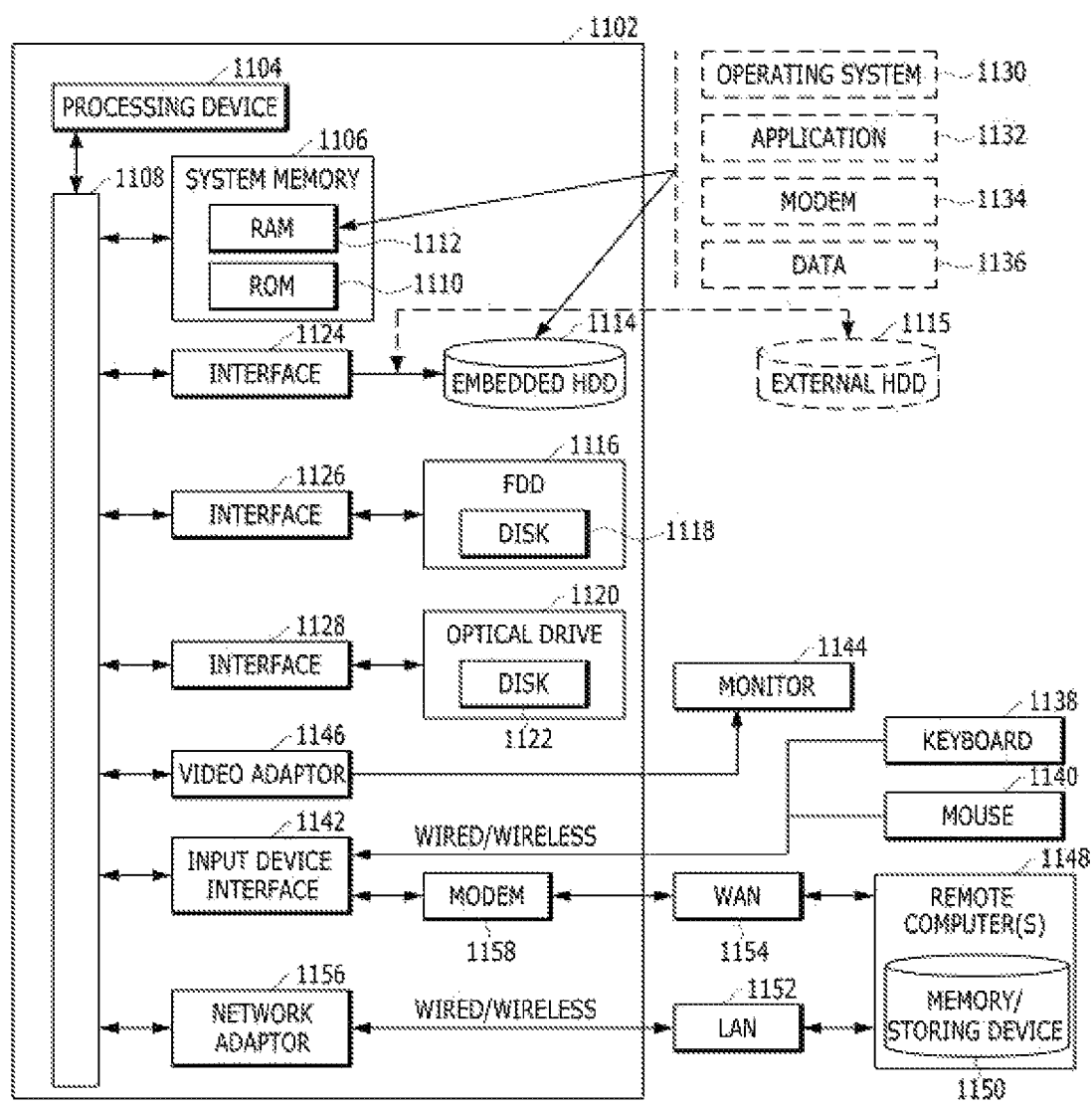
FIG. 10 is a simple and general schematic diagram illustrating an example of a computing environment in which several exemplary embodiments of the present disclosure are implementable.

FIG. 10 is a simple and general schematic diagram illustrating an example of a computing environment in which several exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Furthermore, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors 110. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes both a universal serial bus (USB) and the Institute of Electrical and Electronics Engineers (IEEE) 1394 interface technology or at least one of the two.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a network environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and facilitates an enterprise-wide computer network, such as an Intranet, and all of the LAN and WAN networking environments may be connected to a worldwide computer network, for example, through the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the network environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communication with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may simply be ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electric fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Furthermore, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A non-transitory computer readable medium storing a computer program, wherein the computer program provides a user interface for social networking when executed by one or more processors, the user interface comprising:
    a first area, displaying a plurality of entities corresponding to a plurality of classes preset according to characteristics of users; and
    a second area, displaying a first subset of contents to a first user as a default view, wherein the first subset of contents are selected based at least in part on at least one first class associated with a first user among the plurality of classes, and enabling to display a second subset of contents based at least in part on a change input, in response to the change input by the first user;
    a map visually depicting information of the users interacting with a first content, which is any one of the contents, wherein the depiction of users interacting with the first content are grouped on the map according to information on user characteristic values of each user interacting with the first content, wherein the user characteristic values are based at least in part on the plurality of classes allocated to each user, and wherein the map also displays information on a user characteristic value of the first user, wherein the user characteristic values of the users interacting with the first content are displayed to be visually discriminated from the user characteristic values of users who do not interact with the first content on the map, and wherein the user characteristics values of the users interacting with the first content are displayed to be visually discriminated on the map based on a type of the interaction.

2. The non-transitory computer readable medium of claim 1, wherein the user interface further comprises:
    a third area enabling the user's input for generating the contents.

3. The non-transitory computer readable medium of claim 1, wherein the user interface further comprises:
    a fourth area being rendered in response to a selection of the first user on any one of the contents,
    wherein the fourth area displays detailed information of the selected contents including at least the map.

4. The non-transitory computer readable medium of claim 3, wherein the fourth area enables the first user to interact with the selected contents.

5. The non-transitory computer readable medium of claim 4, wherein the first subset of the contents is selected based at least in part on the user's interaction with the selected contents.

6. The non-transitory computer readable medium of claim 5, wherein the first subset of the contents displays the contents to the first user, wherein the contents are arranged based on at least one of similarity between the first class and the classes associated with the users who generated each of the contents, or similarity between the first class and the classes associated with the users interacting with each of the contents.

7. The non-transitory computer readable medium of claim 1, wherein the map further displays relationship between the plurality of preset classes.

8. The non-transitory computer readable medium of claim 1, wherein the change input is that at least one of the entities in the first area being selected by the user.

9. The non-transitory computer readable medium of claim 8, wherein the second area displays the second subset of the contents in response to the change input by the first user, wherein the second subset of the contents are selected based at least in part on at least one class associated with the entities selected according to the change input.

10. The non-transitory computer readable medium of claim 1, wherein the plurality of preset classes is assigned to each of the users based at least in part on the characteristics of the users.

11. The non-transitory computer readable medium of claim 1, wherein the characteristics of the user include political disposition.

12. A method for displaying a user interface for social networking in a user terminal, comprising:
    displaying a first area displaying a plurality of entities corresponding to a plurality of classes preset according to characteristics of users; and
    displaying a second area displaying a first subset of contents to the first user as a default view, wherein the first subset of contents are selected based at least in part on at least one first class associated with a first user among the plurality of classes, and enabling to display a second subset of contents based at least in part on a change input, in response to the change input by the first user;
    displaying a map that visually depicts interactions of users with a first content, which is any one of the contents, wherein the depiction of users interacting with the first content are grouped on the map according to information on user characteristic values of each user interacting with the first content, wherein the user characteristic values are based at least in part on the plurality of classes allocated to each user, and wherein the map also depicts information on a user characteristic value of the first user, wherein the user characteristic values of the users interacting with the first content are displayed to be visually discriminated from the user characteristic values of users who do not interact with the first content on the map, and wherein the user characteristics values of the users interacting with the first content are displayed to be visually discriminated on the map based on a type of the interaction.

13. A user terminal, comprising:
    a processor;
    a memory; and
    an output unit providing a user interface,
    wherein the user interface comprises:
    a first area displaying a plurality of entities corresponding to a plurality of classes preset according to characteristics of users; and
    a second area displaying a first subset of contents to the first user as a default view, wherein the first subset of contents are selected based at least in part on at least one first class associated with a first user among the plurality of classes, and enabling to display a second subset of contents based at least in part on a change input, in response to the change input by the first user;

a map visually depicting information of the users interacting with a first content, which is any one of the contents, wherein the depiction of users interacting with the first content are grouped on the map according to information on user characteristic values of each user interacting with the first content, wherein the user characteristic values are based at least in part on the plurality of classes allocated to each user, and wherein the map also depicts information on a user characteristic value of the first user, wherein the user characteristic values of the users interacting with the first content are displayed to be visually discriminated from the user characteristic values of users who do not interact with the first content on the map, and wherein the user characteristics values of the users interacting with the first content are displayed to be visually discriminated based on a type of the interaction on the map.

14. A server, comprising:

a processor;

a network unit; and a memory;

wherein the processor is configured to determine whether to transmit a user interface to a user terminal through the network unit, wherein the user interface comprises:

a first area displaying a plurality of entities corresponding to a plurality of classes preset according to characteristics of users; and a second area displaying a first subset of contents to the first user as a default view, wherein the first subset of contents are selected based at least in part on at least one first class associated with a first user among the plurality of classes, and enabling to display a second subset of contents based at least in part on a change input, in response to the change input by the first user;

a map visually depicting information of the users interacting with a first content, which is any one of the contents, wherein the depiction of users interacting with the first content are grouped on the map according to information on user characteristic values of each user interacting with the first content, wherein the user characteristic values are based at least in part on the plurality of classes allocated to each user, and wherein the map also depicts information on a user characteristic value of the first user, wherein the user characteristic values of the users interacting with the first content are displayed to be visually discriminated from the user characteristic values of users who do not interact with the first content on the map, and wherein the user characteristics values of the users interacting with the first content are displayed to be visually discriminated on the map based on a type of the interaction.

* * * * *